United States Patent

Schneider et al.

[15] 3,676,694

[45] July 11, 1972

[54] POWER OUTPUT ACCESSORY UNIT

[72] Inventors: Franklin R. Schneider, Seattle; Jerry D. Lanphear, Everett, both of Wash.

[73] Assignee: Modern Industries, Incorporated, Seattle, Wash.

[22] Filed: June 4, 1971

[21] Appl. No.: 150,073

[52] U.S. Cl. ...............................307/10 R, 307/26, 307/29, 307/38, 219/134, 219/131 WR
[51] Int. Cl. .........................................................H02j 7/14
[58] Field of Search............................307/9, 10, 26, 29, 38; 219/133, 134, 135, 131 WR; 291/1, 40

[56] References Cited

UNITED STATES PATENTS

| | | | |
|---|---|---|---|
| 2,920,210 | 1/1960 | May.................................219/133 X |
| 2,976,424 | 3/1961 | Anderson.........................290/40 R X |
| 3,098,191 | 7/1963 | Cavert et al. .............................322/79 |
| 3,293,443 | 12/1966 | Burch, Jr. .................................307/38 |
| 3,456,119 | 7/1969 | Schneider........................307/10 R X |
| 3,497,709 | 2/1970 | Chilton et al........................307/10 R |
| 3,586,868 | 6/1971 | Martens et al. .....................307/10 R |

*Primary Examiner*—William M. Shoop, Jr.
*Attorney*—Graybeal, Cole & Barnard

[57] ABSTRACT

An accessory unit for use with an engine powered vehicle having a conventional electrical system including a battery, voltage regulator and a dynamo of the alternator type having exposed AC and DC taps which in normal operation supplies DC power to the engine electrical system and, in some embodiments, to the electrical system of a host vehicle. A switch is provided to disconnect the dynamo from the engine electrical system. Also provided is a manually adjustable potentiometer through which the alternator output may be controlled. Circuit means feed the DC output of the dynamo to a welding terminal and the AC output of the dynamo to a step up transformer. A rectifying circuit rectifies the boosted AC output of the transformer and an outlet receptacle permits delivery of a 110–120 volt DC power output to power tools and like loads.

Both the DC welding output terminals and the DC outlet receptacle have a common ground return through resistance means. Placement of a load across either the welding terminals or the DC outlet receptacle produces a voltage drop across the said resistance means, and this voltage drop is utilized to actuate a throttle control circuit including a control transistor, a power transistor and a solenoid type throttle control, functioning to increase the speed of the host vehicle engine when substantial load current is called for at either power output.

19 Claims, 3 Drawing Figures

PATENTED JUL 11 1972 3,676,694
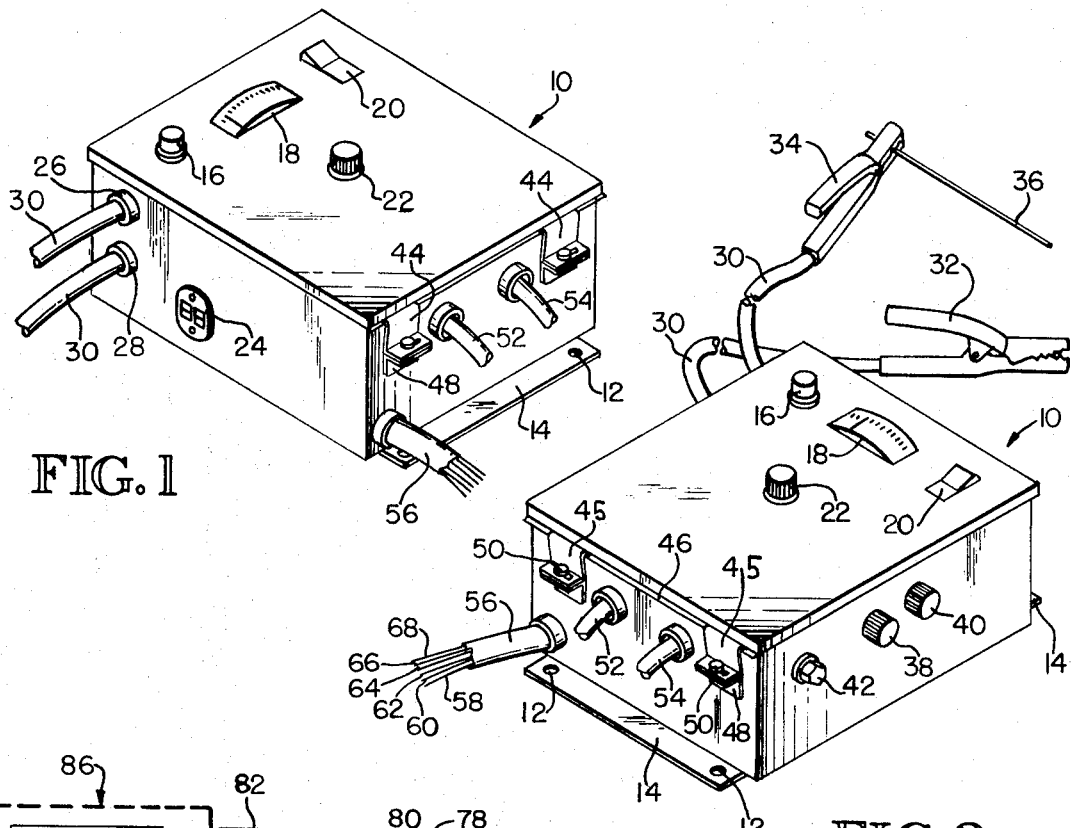
FIG. 1
FIG. 2
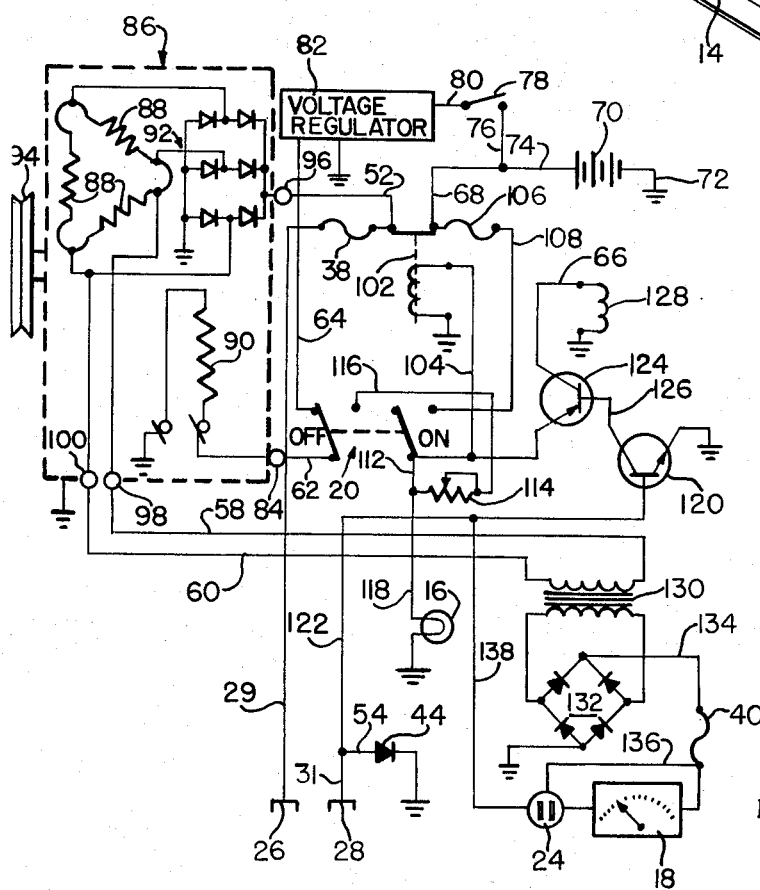
FIG. 3
INVENTORS
FRANKLIN R. SCHNEIDER
JERRY D. LANPHEAR
BY Graybeal, Cole & Barnard
ATTORNEYS

POWER OUTPUT ACCESSORY UNIT

BACKGROUND OF THE INVENTION

1. Field of the Invention

This invention relates to power units for use in conjunction with conventional electrical systems of engines, including the electrical systems of engine powered land or water vehicles, to provide a DC output for powering loads. More particularly, this invention relates to a power output accessory unit for use in conjunction with an alternator having exposed AC and DC output taps, whereby the DC output of the alternator is employed to power relatively low voltage DC loads such as a DC welding rod, while the AC output of the alternator is employed to power a relatively high voltage DC load such as a power drill, pump or the like. Even more particularly, this invention relates to a power output accessory unit having output ground circuitry including a resistance means, such as a diode, whereby the voltage drop across said resistance means is employed to actuate a throttle control circuit for the engine, speeding up the engine during periods when the load or loads require substantial power output.

2. Description of the Prior Art

Conventional electrical systems of engines, including those used to power land and marine craft, generally include a DC battery, a dynamo adapted to deliver low voltage DC power to the electrical system of the craft and a voltage regulator controlling the output voltage of the dynamo in response to the charge variation of the battery. At present, an alternating current generator or "alternator" is the type dynamo commonly in use on engine powered vehicles, and conventional alternators include a stator having three windings usually arranged in either what is known as a wye or star configuration or in a delta configuration to provide a three-phase AC output and an engine driven rotor with a field winding. Alternators of this type generally include a built-in rectifying circuit adapted to transform the AC output to DC which is then used to power the vehicle DC electrical system and charge the vehicle battery.

An alternator often used on motor vehicles is a 40 or 60 amp alternator having a wye connected stator winding with only the DC output tap and not the AC output taps exposed. As will be described more completely hereafter, in its preferred embodiment the power unit of the instant invention is used in conjunction with a 60 amp alternator having a delta connected stator winding and further including exposed AC taps as well as the conventional DC taps. It will be understood, however, that this invention can be used with alternators having either wye or delta connected rotors where necessary.

BRIEF SUMMARY OF THE INVENTION

In one form of the present invention, a typical power output accessory unit made according to the instant invention is interconnected with the electrical system of a conventional land or water vehicle including a DC battery, a voltage regulator and an alternator having a delta connected stator winding and AC and DC external outputs. The power output accessory unit includes switch means to uncouple the DC output of the alternator from the engine battery and direct this output to the positive side of a welding terminal or like outlet receptacle for powering relatively low voltage high amperage loads. A potentiometer or variable resistor allows manual control of the output of the alternator to provide a desired welding heat. The negative side of the welding terminal is grounded through a resistance means, such as a diode, across which a small (e.g. ¾ volt) voltage drop appears when a load is applied at the welding terminals. This voltage drop is employed as the input to engine throttle control components acting to increase vehicle engine speed to a predetermined number of RPM's providing full alternator output. The throttle control circuit preferably includes an NPN type control transistor adapted to be driven into saturation by the positive voltage potential at the anode of the diode in the ground circuit, a PNP type power transistor adapted to be saturated through base bias derived from the NPN control transistor, and a solenoid operated throttle control responsive to current flow through the power transistor.

The AC taps of the alternator are connected to a transformer adapted to step up the AC output of the alternator. The stepped up AC alternator output is then rectified to produce 110–120 volt DC power which is delivered to an outlet receptacle. In one embodiment of the invention the load sensing resistance means in the ground circuit of the welder is connected such that the voltage drop thereacross is also generated by the placement of a load on the relatively high voltage outlet receptacle, and thus the throttle control circuit is actuated by the imposition of a load requiring substantial power at either the welding terminal or the relatively high voltage outlet receptacle.

While this invention is discussed herein primarily with reference to a land or marine vehicle electrical system, it will be understood that it may also be employed in conjunction with engines at fixed locations to power a welding terminal or loads having 110–120 power requirements, or both.

It is an object of the present invention therefore, to provide a power output accessory unit adapted to supply power for welding or for electric tools, lights or the like, or both.

Another object of the present invention is to provide a power output accessory unit for use on an engine powered land or water vehicle which is relatively inexpensive to construct and simple to install.

More particularly, it is an object of the present invention to provide a power output accessory unit for use in conjunction with a conventional engine electrical system including an alternator having delta connected stator windings.

Still another object of this invention is to provide a power output accessory unit adapted to alternatively use both the DC and AC outputs of an alternator type dynamo.

One more object of the present invention is to provide a power output accessory unit whereby the DC output of an alternator in an engine electrical system is employed to power a DC arc welding type load while the AC output of the alternator is employable to power loads having 110–120 volt DC power requirements.

An additional object of the present invention is to provide a power output accessory unit including an engine throttle control circuit actuated in response to a voltage drop across resistance type load sensing means in the output or load circuit or circuits.

One more object is to provide a power output accessory unit having an engine throttle control circuit including a control transistor adapted to be turned on by a voltage drop across a resistance means in the output or load circuit or circuits, a power transistor controlled by said control transistor, and a solenoid operated engine throttle control responsive to the power transistor.

Other objects and advantages of the present invention will be apparent to those skilled in the art from the following description taken in conjunction with the accompanying drawings.

BRIEF DESCRIPTION OF THE DRAWINGS

FIG. 1 is a left side perspective view of a typical power output accessory unit made according to the instant invention, including portions of a pair of welding cables and an outlet receptacle on the side thereof.

FIG. 2 is a right side perspective view of the device of FIG. 1, including welding clamps on the welding cables.

FIG. 3 is a schematic drawing of the electrical circuitry of a typical power output accessory unit made according to the instant invention, including the battery, voltage regulator and alternator of a conventional engine electrical system.

DETAILED DESCRIPTION OF THE INVENTION

FIGS. 1 and 2 show a typical embodiment of a power output accessory unit according to the present invention, adapted to be used for arc welding and/or as a power source for loads having 110–120 volt DC power requirements. This unit, the casing of which is generally indicated at 10, is mountable on a land or water vehicle at a position where it can be relatively easily interconnected with the engine electrical system, as by means of conventional fasteners such as machine screws or bolts inserted through the holes 12 on mounting brackets 14 or by any other suitable means. Typical dimensions for this unit are 5 × 9 ¾ × 11 ½, with a typical weight of approximately 32 pounds. Off-on indicator light 16 is mounted on the face of the unit adjacent voltmeter 18 and manual off-on switch 20. Adjustable control knob 22 through which, as described more completely hereafter, the alternator field, and thus the alternator output, may be controlled, is also mounted on the face of casing 10. 110–120 volt DC outlet receptacle 24 is positioned on the left side of the unit adjacent conventional jack receptacles 26 and 28 which are adapted to receive cooperating plugs on the ends of welding cables 30. As seen in FIG. 2, the cable 30 associated with negative or return jack receptacle 28 includes a ground clamp 32 adapted to grip the work to be welded, while clamp 34 on cable 30 running from positive or output jack receptacle 26 holds a welding rod 36. The removable cap 38 for the 4 amp control fuse and the removable cap 40 for the 10 amp output fuse are disclosed on the side of casing 10, along with the washer and nut mounting 42 for the diode 44 in the ground circuit of the unit. This mounting of the diode 44 allows the casing 10 to be used as a heat dissipating sink, although it will be understood that additional heat dissipating means may be mounted externally on the casing if needed.

Referring now to the bottom side of the unit, conventional clamps 45 are provided to hold the lip 46 of the front cover of the unit which is adapted to pivot upwardly about hinges (not disclosed) at the top of the unit in order to service the unit. Clamps 45 are adapted to be fastened to L shaped brackets 48 by means of cooperating nuts and bolts 50 disposed in adjacent slots in clamp 44 and bracket 48. The bottom side of the casing 10 additionally includes the connections for heavy duty leads 52, 54 and six conductor bundle 56, fragmentarily illustrated. For the sake of wiring convenience, in actual construction all possible connections for the unit are made at the alternator, and thus heavy duty lead 52 is the DC output lead from the battery terminal of the alternator, lead 54 is the ground lead which, as discussed hereafter with reference to FIG. 3, includes a resistance means such as diode 44, while six conductor bundle 56 includes leads 58 and 60 from the AC taps of the alternator, alternator field lead 62 to one terminal of the double pole, double throw switch 20, lead 64 from the voltage regulator to switch 20, lead 66 to the throttle control valve and lead 68 running from the battery disconnect contactor in the unit to the battery of the engine electrical system.

Referring now to FIG. 3, the circuitry of a typical embodiment of the power output accessory unit of the present invention is disclosed connected to a conventional vehicle engine electrical system which includes a 12 volt DC storage battery 70 having a grounded negative terminal 72 and an ungrounded positive terminal 74 which is connected through lead 76, vehicle ignition switch 78 and lead 80 to deliver an input to voltage regulator 82, and which is additionally connected through lead 64, switch 20 and lead 62 to the field winding terminal 84 of the alternator. For drawing clarity, the circuitry of the alternator is generally enclosed within dashed line 86. As shown, double pole, double throw switch 20 of the power unit is in the off position such that the engine electrical system operates in the conventional manner to maintain the charge of battery 70 and to power any low voltage vehicle loads.

Alternator 86 includes delta connected stator windings 88, field coil 90, and a bridge rectifier circuit 92. A pulley 94 adapted to interconnect with and be driven by a V belt running from the engine is also disclosed. As has been set forth briefly above, conventional vehicle electrical system dynamos supply low voltage DC power to the vehicle electrical system and maintain the charge of the battery 70. The conventional alternator is an AC voltage generator and thus bridge rectifier circuit 92 is included within the alternator such that a DC output is supplied to battery terminal 96. The preferred form of alternator for use in conjunction with the instant power output accessory unit additionally includes AC output taps 98 and 100 to which leads 58 and 60 are connected. It has been found that a 60 amp alternator wired as disclosed in FIG. 3 is adequate to power the instant power output accessory unit under most circumstances, although it is contemplated that a 100 amp or larger alternator might also be used. It will be understood that during installation of the power output accessory unit of the present invention on a land or water vehicle that the stator of the alternator, if a 60 amp wye connected alternator is present on the vehicle, may be rewired to a delta configuration and AC output taps added. In practice, it is contemplated that a 60 amp or larger alternator, wired as disclosed in FIG. 3, will merely be substituted for the standard wye connected alternator on the vehicle.

As is known, a delta connected alternator provides a somewhat lower amperage output at low engine speeds as compared with a wye connected alternator, but provides a far higher out-put at high engine speeds. For example, a 60 amp wye connected alternator may provide 15 amps at engine idle speeds and a maximum of 60 amps at 1,800 rpm's while a 60 amp delta connected alternator may provide only 5 amps at engine idle speeds but in the neighborhood of 100 amps at 1,800 rpm's. It will thus be understood that the substitution of the delta connected alternator for the wye or star connected alternator while providing greater available power will not effect the normal operation of the engine electrical system, except possibly under conditions where there is a high amperage draw from the vehicle electrical system at engine idle, and this may be easily corrected by increasing engine speed slightly. Again, it should be understood that the instant invention may be used in conjunction with a wye connected alternator where desired, but that more satisfactory operation particularly in the welding mode, results when a delta connected alternator is used.

To operate the instant power output accessory unit for welding and/or to operate power tools or the like having 110–120 volt DC power requirements, switch 20 is moved to the on position energizing the coil of contactor 102 through lead 104 to disconnect the DC output of alternator terminal 96 from the battery 70. The disconnection of the alternator from the battery allows the alternator voltage to run up, and for a 60 amp alternator having delta connected stator windings, this voltage will increase to approximately 40 volts, a good voltage for striking an arc in arc welding. After striking of the arc, this alternator output voltage stabilizes at between 25 and 30 volts, a good voltage for welding.

The movement of switch 20 to the on position additionally completes the circuit running from the positive side of the battery through lead 68, fuse 106 which, in one embodiment of the invention, has a capacity of 4 amps, lead 108, switch 20, lead 112 and thence through potentiometer 114. The field terminal 84 of the alternator 86 is now energized through lead 116 by the potentiometer 114 and thus manual adjustment of the potentiometer by manipulation of potentiometer control knob 22, allows the alternator output to be controlled. As will be also seen from FIG. 3, indicator light 16 is powered through lead 118 when switch 20 is moved to the on position.

With the power output accessory unit turned on, the unit is now ready to be used for arc welding through jack receptacles 26 and 28 or to power tools or the like having higher voltage 110–120 volt DC load requirements through outlet receptacle 24.

To use the instant invention for arc welding, switch 20 is moved to the on position to set up the unit as described above. Potentiometer control knob 22 is adjusted to set the output of the alternator to produce a desired and adequate welding heat. Ground clamp 32 is clamped to the work to be welded and an arc is struck between the work and welding rod 36 held by clamp 34 extending from the positive side 26 of the welding terminal. Referring to FIG. 3, it will be understood that welding current is drawn directly from the DC output of the alternator 96 through lead 52, fuse 38, lead 29 jack receptacle 26, through cable 30 to clamp 34. Ground clamp 32 grounds through cable 30, jack receptacle 28 and lead 31 through lead 54 which which includes a resistance means such as diode 44.

During welding, a voltage drop of approximately 0.7 volts is produced across diode 44 and the positive voltage potential at the anode of the diode provides base bias to a transistor 120 through lead 122 to drive it into saturation. Control transistor 120 is of the NPN type, and upon being turned on by diode 44 negatively biases the base of PNP type power transistor 124 through lead 126 to turn it on. Power transistor 124 in turn energizes the coil 128 of the solenoid type throttle control to speed the engine to a predetermined rpm setting to produce optimum power output for welding.

While the use of a diode 44, which provides a constant voltage drop independent of the current flow, has been disclosed, and is preferred for rendering transistor 120 conductive, it will be understood that any resistance means of appropriate size may be employed to perform a like function. In fact, it is contemplated that a resistor having linear load response characteristics may be advantageously used to generate a control signal to actuate throttle control means which is progressively responsive to the load power requirement. It will also be understood that diode 44 or an appropriate resistor or the like could be positioned at other points in the disclosed circuitry to produce a voltage drop thereacross when the output is placed under load, and such change in position is considered to be within the scope of the invention.

In practice, it has been found that a 60 amp alternator having delta connected stator windings may be employed as illustrated in FIG. 3 to produce ample power for welding with ⅛ inch welding rod. Of course, the use of a 100 amp, or larger, delta connected alternator would allow welding with even larger diameter rods.

Referring again to FIG. 3, the use of the instant invention to power a load having 110-120 volt DC power requirements will now be described. Again, switch 20 is turned to the on position to set up the unit in the manner previously described and the field of the alternator is adjusted by means of potentiometer 114 to produce an AC output voltage at output terminals 98 and 100 which may optimumly be used to provide 110-120 volt DC power at outlet receptacle 24. For example, an output voltage of approximately 30 volts may be used in conjunction with a one-to-four step up transformer 130 to produce 110-120 volt power.

The load to be powered is plugged into outlet receptacle 24 and turned on. The output of AC alternator terminals 98 and 100 is fed by leads 58 and 60 to step-up transformer 130, and rectifier circuit 132 is provided to rectify the stepped up AC output of transformer 130 which is then transmitted to outlet receptacles 24 through lead 134, fuse 40 and lead 136.

As has been described above, voltmeter 18 is provided to allow monitoring of the outlet receptacle voltage so that this voltage may be easily maintained by manipulation of alternator output control knob 22 at the desired 110-120 volt level.

Outlet receptacle 24 is grounded through leads 138, 122 and 54 through the diode 44 or other resistance means through which the welding terminal is also grounded, and thus it will be understood that the imposition of a load at outlet receptacle 24 causes a voltage drop across diode 44 which actuates the engine throttle control circuitry. Again, the voltage drop across diode 44 turns on transistor 120 which turns on transistor 124 which, in turn, actuates the coil 128 of the solenoid type throttle control thereby increasing the speed of the engine to a predetermined level to provide a relatively constant 110-120 volt DC output at outlet receptacle 24.

It will be understood that the outlet receptacle 24 and the welding terminals 26 and 28 may be provided with separate ground circuits each including a resistance means such as a diode and still be considered to be within the scope of this invention.

The solenoid type throttle control referred to above is not per se a part of the instant invention and may comprise a solenoid actuated valve, a straight solenoid actuator or other conventional actuating means.

It is also to be understood that the instant unit may be readily modified to power loads having 240 volt DC power requirements by the substitution of larger capacity components, and such modification is considered to be well within the scope of the instant invention.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A power output unit for use with an engine of the type having an electrical system including a DC storage battery; an engine driven alternator including a field winding terminal, an AC output terminal, and a DC output terminal which normally delivers low voltage DC power to said electrical system; and a voltage regulator receiving a power input from said DC storage battery, and having a field terminal connected to the field winding terminal of said alternator; said power output unit adapted to act as a power source for low voltage loads or for loads having higher voltage DC power requirements, including:

switch means disconnecting said alternator from said engine electrical system;

manually adjustable potentiometer means controlling said alternator output;

circuit means applying the DC output of said disconnected alternator to a welding terminal;

circuit means applying the AC output of said alternator to a step-up transformer;

means rectifying said stepped up AC transformer output; and outlet receptacle means associated with said rectifying means and adapted to receive jacks connected to power loads having higher voltage DC power requirements.

2. The power output unit of claim 1 including circuit means delta connecting the stator windings of said alternator.

3. The power output unit of claim 1 including circuit means grounding said welding terminal and said outlet receptacle means, said circuit means including means having a positive voltage potential thereacross when said unit is powering a load, and engine throttle control means increasing the speed of said engine responsive to said voltage drop.

4. The power output unit of claim 3 wherein said engine throttle control means includes an NPN type control transistor driven to saturation by said positive voltage potential means; a PNP type power transistor driven to saturation by said NPN type transistor; and, an engine throttle control including a solenoid in circuit with said PNP type transistor and acting to increase the speed of said engine.

5. The power output unit of claim 3 wherein said means having a positive voltage potential thereacross comprises a solid state diode.

6. The power output unit of claim 5 wherein the cathode of said diode has a common ground with the grounded terminal of said DC storage battery.

7. The power unit of claim 6 wherein all of the output load current is conducted through said diode.

8. A power output unit for use with an engine of the type having an electrical system including a DC storage battery; an engine driven alternator having delta connected stator windings and including AC output terminals, a field winding terminal and a DC output terminal which normally delivers low voltage DC power to said engine electrical system; a voltage regulator receiving a power input from said DC storage battery, and having a field terminal connected to the field winding terminal of said alternator; said power output unit adapted to power a relatively low voltage arc welder having positive and negative terminals and loads having higher voltage DC power requirements, and including:

switch means disconnecting said alternator from said engine electrical system;

manually adjustable potentiometer means controlling said alternator output;

circuit means directing the DC output of said alternator to said positive welding terminal;

ground circuit means associated with said negative welding terminal and including load sensing means having a voltage drop thereacross when said unit is powering a load;

an engine throttle control circuit responsive to the voltage drop across said load sensing means;

circuit means directing the AC output of said alternator to step-up transformer means;

rectifier circuit means rectifying said stepped-up AC transformer output and applying said rectified output to outlet receptacle means; and circuit means grounding said outlet receptacle through the ground circuit means associated with said negative welding terminal.

9. The power output unit of claim 8 wherein said engine throttle control circuit includes an NPN type transistor driven to saturation by the voltage drop across said load sensing means; a PNP type transistor driven to saturation by said NPN type transistor; and, an engine throttle control including a solenoid energized by said PNP type transistor adapted to increase the speed of said engine.

10. The power output unit of claim 8 wherein said load sensing means having a voltage drop thereacross when said unit is powering a load includes a solid state diode.

11. The power output unit of claim 9 wherein said engine speed is increased to a predetermined value adequate to obtain substantially full output from said alternator.

12. A power output unit for use with an engine of the type having an electrical system including a DC storage battery; an engine driven alternator having a field winding terminal, an output terminal which normally delivers low voltage DC power to said electrical system; and a voltage regulator receiving a power input from said DC storage battery, and having a field terminal connected to the field winding terminal of said alternator; said power output unit adapted to act as a power source for loads having higher voltage DC power requirements and including:

switch means disconnecting said alternator from said engine electrical system;

circuit means applying the output of said disconnected alternator to an outlet receptacle;

grounding circuitry associated with said outlet receptacle, said grounding circuitry including a resistance means having a voltage drop thereacross generated in response to occurrence of a load on said outlet receptacle;

means responsive to the voltage drop across said resistance means energizing an engine throttle control circuit to increase the speed of said engine.

13. The power output unit of claim 12 further comprising an engine throttle control solenoid for actuating an engine throttle control valve; said solenoid being connected to be energized by said engine throttle control circuit, said circuit including a power transistor of the PNP type driven to saturation by a control transistor of the NPN type; and said control transistor being driven to saturation by the voltage drop across said resistance means.

14. The power output unit of claim 12 wherein said means having a voltage drop thereacross comprises a solid state diode.

15. The power output unit of claim 14 wherein the cathode of said diode has a common ground with the grounded terminal of said DC storage battery.

16. The power unit of claim 15 wherein all of the output load current is conducted through said diode.

17. The power output unit of claim 13 wherein said means having a voltage drop thereacross comprises a solid state diode.

18. The power output unit of claim 17 wherein the cathode of said diode has a common ground with the grounded terminal of said DC storage battery.

19. The power unit of claim 18 wherein all of the output load current is conducted through said diode.

* * * * *